United States Patent [19]
Guth et al.

[11] Patent Number: 5,599,758
[45] Date of Patent: Feb. 4, 1997

[54] REGENERATION OF CATALYST/ABSORBER

[75] Inventors: Eugene D. Guth, Torrance, Calif.; Larry E. Campbell, Knoxville, Tenn.

[73] Assignee: Goal Line Environmental Technologies, Los Angeles, Calif.

[21] Appl. No.: 371,274

[22] Filed: Dec. 23, 1994

[51] Int. Cl.$^6$ .............. B01J 20/34; B01J 38/10; B01J 38/36
[52] U.S. Cl. .............. 502/34; 502/42; 502/53; 502/56
[58] Field of Search ............... 502/34, 42, 51, 502/53, 56

[56] References Cited

U.S. PATENT DOCUMENTS

| | | | |
|---|---|---|---|
| 3,230,179 | 1/1963 | Schwarzaenbek | 502/53 |
| 3,856,485 | 12/1974 | Mansell | 55/73 |
| 3,953,575 | 4/1976 | Gidaspow et al. | 423/212 |
| 4,323,544 | 4/1982 | Maader | 423/239 |
| 4,533,365 | 8/1985 | Ringel | 55/28 |
| 4,789,531 | 12/1988 | Eichholtz et al. | 423/235 |

Primary Examiner—Anthony McFarland
Assistant Examiner—Alexander G. Ghyka
Attorney, Agent, or Firm—Kenneth H. Johnson

[57] ABSTRACT

Hydrogen or carbon monoxide in a carrier of nitrogen or steam is passed over a devitalized catalyst/carbonate or bicarbonate absorber which has absorbed or adsorbed nitrates and nitrites from engine exhaust to restore the carbonate form and regenerate the devitalized catalyst/absorber for reuse.

20 Claims, No Drawings

REGENERATION OF CATALYST/ABSORBER

BACKGROUND OF THE INVENTION

1. Field of the Invention

This invention is directed to a process for the regeneration of the devitalized catalyst/absorber after extended exposure to pollutants in the combustion gases of engines.

2. Related Information

Turbine power plants are becoming the standard for generating electricity because they are so efficient compared to any other form of power manufacture. Turbine power plants that burn methane to produce power for residents and manufacturing facilities in cities also produce carbon monoxide and nitrogen oxide as pollutants. It is highly desirable to reduce or eliminate these pollutants so that the air is not contaminated as a result of power production.

Over the years, as the technology improved, the level of permitted pollution has been decreased. Initially, the permitted level of pollution by power plants for nitrogen oxides (NOx), which includes nitric oxide (NO) and nitrogen dioxide ($NO_2$), was less than 100 parts-per-million (ppm) and the level of carbon monoxide (CO) was less than 100 ppm. Later, the requirements were made more stringent and it was necessary to reduce the NOx to less than 25 ppm and the CO today is still permitted at any amount less than 100 ppm. Using current technology, the output levels of NOx can be reduced to the range of 5 to 9 ppm plus slippage resulting from the selective catalytic reduction (SCR) technology described below.

The only prior technology which is currently available to obtain the 5 to 9 ppm NOx levels is called selective catalytic reduction in which ammonia is mixed with the flue gas and then passed over a catalyst which selectively combines the nitrogen oxides and ammonia to eliminate a major portion of the NOx. One problem with the selective catalytic reduction is than, as a practical matter, it is only capable of reducing the NOx to the range of 5 to 9 ppm. Another problem, referred to as slippage, is that the ammonia injected into the system to react with the NOx slips past the catalyst without conversion and is ejected from the system in its native form, which is hazardous to the environment in its own right.

There have been other technologies for reduction of pollution which have been advanced, such as overwatering in the combustor, and these also have the potential to reduce the NOx pollution, but none of them reduce the NOx to levels much less than 5 to 9 ppm.

In our co-pending application Ser. No. 08/066,361 filed on May 24, 1993, which is incorporated herein in its entirety, we described a pollution reduction process and apparatus in which the pollutants from a turbine gas stream including NO and CO in the gas stream are first oxidized to corresponding $NO_2$ and $CO_2$, and then the $NO_2$ is absorbed on an absorption bed.

In our co-pending U.S. Pat. No. 5,451,558 which is incorporated herein in its entirety, a catalyst/absorber is described comprising an oxidation catalyst specie selected from platinum, palladium, rhodium, cobalt, nickel, iron, copper, molybdenum or combinations thereof disposed on a high surface area support, said catalytic component being intimately and entirely coated with an absorber material selected from a hydroxide, carbonate, bicarbonate or mixture thereof of an alkali or alkaline earth or mixtures thereof. For example a support with an alumina washcoat disposed thereover, a platinum catalyst disposed on the washcoat, and with an alkali or alkaline earth carbonate or bicarbonate coating thereon, the carbonate coating being lithium, sodium, potassium or calcium carbonate. This application also discloses a process for treating exhaust streams in which the stream is contacted with the catalyst/absorber which oxidizes the nitrogen oxides to nitrogen dioxide; oxidizes the carbon monoxides to carbon dioxide; and oxidizes the sulfur dioxide ($SO_2$) to sulfur trioxide ($SO_3$). This oxidation occurs at temperatures in the range of 150° to about 750° F., and more preferably in the range of 175° to 400° F., and most preferably in the range of 200° to 365° F. The space velocity (GHSV) of the exhaust gas may be in the range of 5,000 to 50,000 $hr^{-1}$. The same catalyst/absorber has a second function of absorbing the oxidized pollutants at the same temperatures so that the resultant exhaust gas stream is substantially free of harmful pollutants.

When the catalyst/absorber ceases to be effective, and specifically, when the level of pollutants emanating from the apparatus after contact with the catalyst/absorber increases beyond an acceptable level, the absorber can be replaced, and the used absorber should then be recharged to an effective status again. One method of regenerating the catalyst is to remove the spent (saturated or partially saturated) carbonate from the catalyst/absorber and replace the spent carbonate with fresh unreacted carbonate, for example, dissolving the absorber, generally potassium carbonate or sodium carbonate, from the absorber/catalyst to remove the absorber from the catalyst, and then replacing the absorber on the catalyst with fresh absorber. The nitrates and nitrites are then separated from the unreacted carbonate in the dissolved absorber so the unreacted carbonate can be reused. However this process would most likely require removal of the catalyst/absorber from the exhaust system and create large quantities of liquid waste streams to dispose of.

It would be desirable to provide a system for regenerating the absorber, rather than removing it, which is easier, simpler, faster, less labor intensive and less expensive than those systems known in the prior art.

It is an advantage of the present invention that the regeneration of the catalyst/absorber may be carried out in situ. It is a further advantage of the present invention that it is carried out without liquid reagents. It is a feature of the present invention that the by-products of the regeneration are easily disposed of. It is a particular feature of the invention that the gases used in the regeneration are low cost and readily available.

SUMMARY OF THE INVENTION

In the present invention, a devitalized catalyst/absorber is regenerated, that is, treated to restore the initial activity or to otherwise substantially improve the activity, by passing a regeneration gas over it. Briefly the present invention is a method for regenerating devitalized absorber used for removing nitrogen oxides from gases and containing an alkali or alkaline earth metal carbonate or bicarbonate component of the absorber comprising: contacting the devitalized absorber with a gaseous stream containing an effectuating amount of reducing agent to remove a portion of the nitrogen oxides. In a preferred embodiment the devitalized absorbent is a component of a catalyst/absorbent composition. Suitable reducing agents include carbon monoxide, hydrogen and mixtures thereof. The principal component of the gaseous stream is an inert carrier gas such as nitrogen, helium, argon or steam.

DETAILED DESCRIPTION OF THE INVENTION

The regeneration gas comprises a reactant gas or mixture of reactant gases along with a carrier gas or carrier gas mixture. The reactant gases are reactive reducing agents to convert the oxidized forms of the absorber made in the absorption step. The preferred reactants gases are carbon monoxide or hydrogen or combinations of carbon monoxide and hydrogen. The reactant gases make up about 500 ppm to 10 percent of the regeneration gas; the remainder of the regeneration gas is the carrier gas mixture.

The carrier gas may comprise principally nitrogen or steam, for example, preferred 50 percent or more nitrogen and may have smaller concentrations of carbon dioxide and steam or 50 percent or more steam and may have smaller concentrations of nitrogen and carbon dioxide. Nitrogen in high concentrations of about 50% to about 80% provides an excellent carrier for the reductants. Steam is also a good carrier in concentrations of 30% to 98% with the balance being nitrogen.

The regeneration gas is substantially oxygen free, although up to one percent oxygen may be present without significant negative effects.

The devitalized catalyst/absorber has absorbed or adsorbed nitrogen oxides and sulfur oxides in a plurality of chemical forms. The reactant gas reduces the nitrogen oxides to eliminate nitrogen and displaces the sulfur oxide. The apparent stoichiometry is two moles of carbon monoxide and/or hydrogen for each mole of nitrogen oxide on the catalyst/absorber and one mole of reactant gas for each mole of sulfur oxide on the catalyst/absorber.

The regeneration of the catalyst/absorber by this method can be performed at temperatures preferably in the range of 250° to 750° F. and preferably at a pressure of substantially one atmosphere pressure. Usually the temperature is the same temperature at which absorption was carried out, for economic reasons, but there is no actual limitation on the temperature provided that it is within the range set forth above. The gaseous stream may be conducted through the regeneration chamber at a fairly wide range of flow rates. The optimum flow rate will depend upon such variables as the temperature of the reaction, pressure and particle size or channel size in the case of certain supports. The flow rate is measured by the gaseous volumes of the regeneration stream (including the carrier and reactive gases) per volume of chamber containing catalyst/absorber per hour, referred to as the gas hourly space velocity (GHSV). The GHSV for the present regenerations may be in the range of 10 hr$^{-1}$ to 100,000 hr$^{-1}$, preferably at least 100 hr$^{-1}$ and less than 30,000 hr$^{-1}$, more preferably in the range of 500 hr$^{-1}$ to 16,000 hr$^{-1}$. The regeneration time is determined by the stoichmetries, i.e., moles absorbed and the concentration of the reactant gas and the flow rate of the regeneration gas. The regeneration reactions are rapid and completion of regeneration can be determined by monitoring the off gas for reactant gases. Usually the regenerations within the preferred temperature range will require at least about 2 minutes to about 10 minutes. At temperatures substantially the preferred range regenerations can require up to an hour.

Efficiencies of up to 99.9% for nitrogen oxide reactions to nitrogen and water can occur during the regeneration.

Carbon dioxide, up to at least about 10%, may be added to regeneration gases containing hydrogen to regenerate the carbonate form.

The regeneration system of the present invention works with both non-aqueous and aqueous platinum deposited catalysts.

EXAMPLES

The following test results show that the catalyst/absorber can be regenerated with satisfactory performance. In the examples which utilized a catalyst/absorber of PtMO, these are made by a non-aqueous process described in Ser. No. 08/307,939 filed Sep. 16, 1994 which is incorporated herein in its entirety. The reference to 0.23% refers to the loading of the catalyst/absorber with 0.23% by weight platinum. The absorber on each of the catalysts is potassium carbonate. In the various examples, the regeneration gas composition, including the reactant and the carrier are varied, and the temperature of regeneration and space velocity are also varied.

In the examples using an aqueous platinum absorber/catalyst, the catalyst is a platinum catalyst prepared from a solution of a mono ethanol amine platinum compound. Hexachloro platinic acid is the starting material. The chloride is quantitatively reacted and completely separated from the platinum. The platinum is dissolved in water as a mono ethanol amine platinum compound and is then applied to a support from this solution. The platinized support is heated to remove the water and mono ethanol amine.

In the following examples several variations in regeneration gases and conditions are demonstrated for both aqueous platinum and organometallic platinum catalysts. Examples 1 through 7 are for aqueous catalysts, and 8 through 12 are for organometallic catalysts.

Aqueous Catalyst Preparation

The catalyst for Examples 1 to 7 is aqueous platinum, prepared as follows:

Alumina wash coat 1.6 gms/cu in.

Platinum loading 46 gms/cu ft. calc at 500° C.

Absorber 7.8% $K_2CO_3$ impregnated at 60° C.

Absorption inlet gas composition for Examples 1 and 2

| $N_2$ | 73% | NO | 30 ppm |
|---|---|---|---|
| $CO_2$ | 3% | CO | 10 ppm |
| Water | 10.2% | | |
| $O_2$ | 13.7% | | |

Example 1

| Absorption temp 300° F.; GHSV 20,000 hr$^{-1}$ | | | | | | | |
|---|---|---|---|---|---|---|---|
| Off Gas | Time, min. | 2 | 6 | 10 | 15 | 20 | 25 | 30 |
| | NOx ppm | 0.65 | 0.78 | 1.0 | 1.3 | 1.8 | 2.1 | 2.8 |
| | CO ppm | 0.9 | 1.4 | 1.8 | 2.2 | 2.7 | 3.1 | 3.4 |

| Regeneration conditions temp 250° F., GHSV 1000 hr$^{-1}$ | | | | |
|---|---|---|---|---|
| Inlet Gas | Steam | 89.7% | Hydrogen | 1.75 |
| | Nitrogen | 7.30 | Carbon Dioxide | 1.25 |
| Off Gas | Time, min. | 0.5 | 1 | 3 | 5 |
| | NOx ppm | .11 | .10 | .11 | .075 |
| | CO ppm | 0 | 0 | 3.2 | 3.8 |

| Absorption temp 300° F., GHSV 20,000 hr$^{-1}$ | | | | | | | |
|---|---|---|---|---|---|---|---|
| Off Gas | Time, min. | 2 | 6 | 10 | 15 | 20 | 25 | 30 |
| | NOx ppm | .7 | .8 | 1.1 | 1.35 | 1.7 | 2.35 | 2.6 |
| | CO ppm | .8 | 1.3 | 1.8 | 2.0 | 2.5 | 2.8 | 3.0 |

Comments:

This test demonstrates absorption—regeneration—absorption at 250°–300° F., using a hydrogen reactant gas and steam carrier gas. The efficiency for NOx destruction was 99.96%; that is, only 0.04% of the NOx absorbed was off gassed during regeneration. The NOx destroyed was converted to elemental nitrogen.

Example 2

| | Absorption temp 690° F.; GHSV 20,000 hr$^{-1}$ | | | | | | |
|---|---|---|---|---|---|---|---|
| Off Gas | Time, min. | 2 | 6 | 10 | 15 | 20 | 25 | 30 |
| | NOx ppm | 0.4 | 0.3 | .3 | .4 | .5 | — | .9 |
| | CO ppm | 0 | 0 | 0 | 0 | 0 | — | |

| | Regeneration conditions temp 714° F., GHSV 1000 hr$^{-1}$ | | | | |
|---|---|---|---|---|---|
| Inlet Gas | Steam | 89.7% | Hydrogen | | 1.73 |
| | Nitrogen | 7.3 | Carbon Dioxide | | 1.25 |
| Off Gas | Time, min. | 1 | 2 | 4 | 5 |
| | NOx ppm | 0.1 | 0.1 | 0.05 | 0.05 |
| | CO ppm | 0 | 0 | 7.4 | 8.5 |

| | Absorption temp 700° F., GHSV 20,000 hr$^{-1}$ | | | | | | |
|---|---|---|---|---|---|---|---|---|
| Off Gas | Time, min. | 2 | 6 | 10 | 15 | 20 | 25 | 30 |
| | NOx ppm | 0.4 | 0.3 | 0.3 | 0.3 | 0.4 | 0.6 | 1.5 |
| | CO ppm | 0 | 0 | 0 | 0 | 0 | 0 | 0 |

Comments: This test demonstrates absorption-regeneration - absorption at 690° F.–714° F. Hydrogen was the reactant gas. The efficiency for NOx destruction was 99.95%.

Absorption inlet gas composition for Examples 3 to 7

| | | | |
|---|---|---|---|
| N$_2$ | 73% | SO$_2$ | 98 ppb |
| CO$_2$ | 3% | NO | 30 ppm |
| Water | 10.2% | CO | 10 ppm |
| Oxygen | 13.8 | | |

Example 3

| | Absorption temp 300° F.; GHSV 20,000 hr$^{-1}$ | | | | | | |
|---|---|---|---|---|---|---|---|---|
| Off Gas | Time, min. | 2 | 6 | 10 | 15 | 20 | 25 | 30 |
| | NOx ppm | .3 | .5 | .7 | .9 | 1.2 | 1.8 | 2.6 |
| | CO ppm | 0 | 0 | 0 | .2 | .2 | .3 | .4 |
| | SO$_2$ ppb | 0 | 0 | 0 | 0 | .5 | 2.0 | 3.8 |

| | Regeneration conditions temp 350° F., GHSV 1000 hr$^{-1}$ | | | | |
|---|---|---|---|---|---|
| Inlet Gas | Steam | 97% | Carbon Dioxide | | 1.25% |
| | Hydrogen | 1.73% | | | |
| Off Gas | Time, min. | 0.5 | 1 | 1.5 | 2 | 3 |
| | NOx ppm | 0.2 | 0.2 | 0.2 | 0.1 | 0.1 |
| | CO ppm | 0 | 0 | 0 | 0 | 0 |
| | SO$_2$ ppb | 16 | 10 | 10 | 10 | 9 |

| | Absorption temp 300° F., GHSV 20,000 hr$^{-1}$ | | | | | | |
|---|---|---|---|---|---|---|---|---|
| Off Gas | Time, min. | 2 | 6 | 10 | 15 | 20 | 25 | 30 |
| | NOx ppm | 0.2 | .6 | .9 | 1.3 | 2.2 | 3.2 | 4.6 |
| | CO ppm | | | | | | | |
| | SO$_2$ ppb | | | | | | | |

Comments:
This test demonstrates absorption—regeneration—absorption at 300° F.–350° F. with steam as the carrier gas and hydrogen as the reactant gas; and a three minute regeneration.

Example 4

| | Absorption temp 300° F.; GHSV 20,000 hr$^{-1}$ | | | | | | |
|---|---|---|---|---|---|---|---|---|
| Off Gas | Time, min. | 2 | 6 | 10 | 15 | 20 | 25 | 30 |
| | NOx ppm | 1.15 | 1.95 | 3.3 | 5.0 | 6.8 | 8.2 | 9.6 |
| | CO ppm | .2 | .6 | 0.9 | 1.3 | 1.8 | 2.1 | 2.4 |
| | SO$_2$ ppb | 2.9 | 2.8 | 6.7 | 11.8 | 16.7 | 21.9 | 25.5 |

| | Regeneration conditions 300° F., GHSV 4,200 hr$^{-1}$ | | | | |
|---|---|---|---|---|---|
| Inlet Gas | H$_2$ ppm | % N$_2$ | % CO$_2$ | % H$_2$O | ppm CO |
| | 2,000 | 76.3 | 13.5 | 10 | 506 |
| Off Gas | Time, min. | 2 | 4 | 6 | 10 | 16 | 20 |
| | NOx ppm | 2.5 | 0.55 | 0.37 | 24 | .17 | .14 |
| | CO ppm | 15 | 8.4 | 10.8 | 15.3 | 20.5 | 14.9 |
| | SO$_2$ ppb | 97 | 16.5 | 8.7 | 8.1 | 7.9 | 7.7 |

| | Absorption temp 300° F., GHSV 20,000 hr$^{-1}$ | | | | | | |
|---|---|---|---|---|---|---|---|---|
| Off Gas | Time, min. | 2 | 6 | 10 | 15 | 20 | 25 | 30 |
| | NOx ppm | .83 | 1.53 | 2.5 | 4.0 | 5.5 | 6.8 | 8.5 |
| | CO ppm | 0 | .4 | .7 | 1.0 | 1.4 | 1.5 | 1.8 |
| | SO$_2$ ppb | .2 | .4 | 4.2 | 7.7 | 12.6 | 16.6 | 21.4 |

Comments:
This test demonstrates absorption—regeneration—absorption with regeneration using nitrogen as the carrier gas and hydrogen and carbon monoxide as the reactant gases at 300° F. at a GHSV of 4,200 hr$^{-1}$. The absorptions were done at 300° F.

Example 5

| | Absorption temp 300° F.; GHSV 20,000 hr$^{-1}$ | | | | | | |
|---|---|---|---|---|---|---|---|---|
| Off Gas | Time, min. | 2 | 6 | 10 | 15 | 20 | 25 | 30 |
| | NOx ppm | .45 | .7 | 1.05 | 1.5 | 2.0 | 2.5 | 3.4 |
| | CO ppm | 0 | .4 | 0.9 | 1.2 | 1.5 | 1.9 | 2.2 |
| | SO$_2$ ppb | 0 | 0 | 0 | 1.1 | 2.8 | 3.7 | 5.7 |

| | Regeneration conditions temp 300° F., GHSV 1000 hr$^{-1}$ | | | | |
|---|---|---|---|---|---|
| Inlet Gas | ppm H$_2$ | | % H$_2$O | | |
| | 2000 | | 99.8 | | |
| Off Gas | Time, min. | 2 | 6 | 10 | 13 | 16 | 20 |
| | NOx ppm | 0 | 0.25 | 0.11 | 0.05 | 0.15 | .25 |
| | CO ppm | 0 | 0 | 0 | 0 | 0 | 0 |
| | SO$_2$ ppb | 0 | 0 | 0 | 0 | 0 | 0 |

Comments:
The efficiency of NOx destruction was 99.85% that is, only 0.15% of the NOx absorbed was desorbed as NOx, and the remainder was converted to elemental nitrogen. Note: the K$_2$CO$_3$ concentration on the catalyst was 10% for this test.

Example 6

| | Absorption temp 300° F.; GHSV 20,000 hr$^{-1}$ | | | | | | |
|---|---|---|---|---|---|---|---|---|
| Off Gas | Time, min. | 2 | 6 | 10 | 15 | 20 | 25 | 30 |
| | NOx ppm | .35 | .45 | .55 | .75 | 1.3 | 1.85 | 2.9 |
| | CO ppm | 0 | 0 | 0 | .1 | .2 | .3 | .4 |

| | Regeneration conditions temp 300° F., GHSV 1000 hr$^{-1}$ | | | |
|---|---|---|---|---|
| Inlet Gas | composition | % H$_2$ | % CO$_2$ | % H$_2$O |
| | | 1.73 | 1.28 | Balance |
| Off Gas | Time, min. | 0.5 | 1 | 2 | 3 | 4 | 5 | 20 |
| | NOx ppm | .05 | .03 | .01 | .03 | .03 | | |
| | CO ppm | | | | | | | |
| | SO ppb | 7.4 | 7.3 | 7.2 | 7.2 | 7.3 | | |

Comments:

This test was done with a five minute regeneration using steam as the carrier gas and hydrogen as the reactant gas with carbon dioxide present. The efficiency for NOx destruction was 99.69%. The $K_2CO_3$ concentration on the catalyst/absorber was 10% for this test.

Example 7

| Absorption temp 300° F.; GHSV 20,000 hr$^{-1}$ | | | | | | | |
|---|---|---|---|---|---|---|---|
| Off Gas | Time, min. | 2 | 6 | 10 | 15 | 20 | 25 | 30 |
| | NOx ppm | .7 | .75 | .80 | 1.05 | 1.25 | 1.7 | 2.4 |
| | CO ppm | 0 | 0 | 0 | 0 | 0 | 0.1 | 0.3 |
| | $SO_2$ ppb | 0 | 0 | 0 | 0 | 0 | 1.2 | 3.1 |
| Regeneration conditions temp 300° F., GHSV 4,600 hr$^{-1}$ | | | | | | | |
| Inlet Gas | | % $H_2$ | | | % $H_2O$ | | | |
| | | 1.73 | | | 98.2 | | | |
| Off Gas | Time, min. | 0.5 | 2 | 4 | 6 | 8 | 10 | 20 |
| | NOx ppm | 0 | 0.6 | 0.5 | .75 | .72 | .72 | |
| | CO ppm | 0 | 0 | 0 | 0 | 0 | 0 | |
| | SO ppb | 0 | 0 | 0 | 0 | 0 | 0 | |

Comments:

This test demonstrates regeneration using steam as the carrier gas and hydrogen as the reactant gas at 300° F. and GHSV of 4,600 hr$^{-1}$. The efficiency for NOx destruction was 99.92%. The $K_2CO_3$ concentration on the catalyst was 10% for this test.

The next Examples, 8 to 12, use organometallic platinum in the catalyst/absorber.

Catalyst for Examples 8 to 12 —Organometallic platinum alumina was coated with 1.6 gms/cu in alumina. Platinum loading 46 gms/cu ft. calcined at 500° C. $K_2CO_3$ absorber 10% impregnated at 60° C.

Absorption inlet gas composition

| $N_2$ | 73% | $SO_2$ | 99 ppb |
|---|---|---|---|
| $CO_2$ | 3% | NOx | 30 ppm |
| Water | 10% | CO | 10 ppm |
| $O_2$ | 13.8 | | |

Example 8

| Absorption temp 300° F. | | | | | | | |
|---|---|---|---|---|---|---|---|
| Off Gas | Time, min. | 2 | 6 | 10 | 15 | 20 | 25 | 30 |
| | NOx ppm | 0.7 | 0.8 | 0.95 | 1.45 | 2.5 | 4.5 | 6.8 |
| | CO ppm | 0 | 0 | 0 | 0 | 0 | 0 | 0.1 |
| | $SO_2$ ppb | 0 | 0 | 0 | 0.2 | 4.0 | 10.4 | 15.8 |
| Regeneration conditions temp 350° F., GHSV 6000 hr$^{-1}$ | | | | | | | |
| Inlet Gas composition | | % $H_2$ | | % $N_2$ | | % $CO_2$ | | % $H_2O$ |
| | | 0.1 | | 76.8 | | 13.13 | | 10 |
| Off Gas | Time, min. | 1 | 3 | 5 | 9 | 11 | 14 | |
| | NOx ppm | 52 | 36 | 25 | 0.07 | 0.65 | 0.65 | |

Comments:

The test demonstrates regeneration with hydrogen as the reactant gas and nitrogen at the carrier gas at 300°–350° F. The efficiency for NOx destruction was 93.4%.

Example 9

| Absorption temp 300° F.; GHSV 20,000 hr$^{-1}$ | | | | | | | |
|---|---|---|---|---|---|---|---|
| Off Gas | Time, min. | 2 | 6 | 10 | 15 | 20 | 25 | 30 |
| | NOx ppm | 0.95 | .99 | 1.17 | 1.7 | 2.9 | 4.7 | 6.6 |
| | CO ppm | 0 | 0 | 0 | 0 | 0.1 | 0.1 | 0.2 |
| | $SO_2$ ppb | 0 | 0 | 0 | 0.8 | 3.8 | 10.7 | 15.2 |
| Regeneration conditions | | | | | | | |
| Inlet Gas | composition | | % $N_2$ | | % $CO_2$ | | % $H_2O$ | |
| | | | 76.8 | | 13.1 | | 10 | |
| Off Gas | Time, min. | 2 | 4 | 8 | 10 | 15 | 17 | |
| | NOx ppm | 21.5 | 27 | 18.5 | 19 | 2.5 | 0.8 | |
| | $SO_2$ ppb | 50.1 | 71 | 55 | 47 | 16 | 9 | |

Comments:

This test demonstrates regeneration using carbon monoxide as the reactant gas and nitrogen as the carrier gas. The efficiency for NOx destruction was 93.0%.

Example 10

| Absorption temp 300° F.; GHSV 20,000 hr$^{-1}$ | | | | | | | |
|---|---|---|---|---|---|---|---|
| Off Gas | Time, min. | 2 | 6 | 10 | 15 | 20 | 25 | 30 |
| | NOx ppm | 1.15 | 1.15 | 1.3 | 1.7 | 2.7 | 4.0 | 5.9 |
| Regeneration conditions | | | | | | | |
| Inlet Gas | composition | % $H_2$ | % $N_2$ | % $CO_2$ | % $H_2O$ | ppm CO | | |
| | | 1000 | 76.8 | 13.1 | 10. | 500 | | |
| Off Gas | Time, min. | 2 | 4 | 6 | 6 | 10 | 12 | |
| | NOx ppm | 60 | 37 | 1.0 | 0.97 | 0.95 | 0.93 | |
| | CO ppm | 4.3 | 4.2 | 4.7 | 7.9 | 8.0 | 8.6 | |

Comments:

This test demonstrates regeneration using hydrogen and carbon monoxide as reactive gases and nitrogen as the carrier gas. The efficiency for NOx destruction was 92.9%.

Example 11

| Absorption temp 300° F.; GHSV 20,000 hr$^{-1}$ | | | | | | | |
|---|---|---|---|---|---|---|---|
| Off Gas | Time, min. | 2 | 6 | 10 | 15 | 20 | 25 | 30 |
| | NOx ppm | 1.2 | 1.3 | 1.55 | 2.25 | 3.25 | 4.95 | 7.9 |
| | CO ppm | .1 | .1 | .1 | .1 | .2 | .2 | .3 |
| | $SO_2$ ppb | 0 | 0 | .4 | 2 | 5 | 9.6 | 20.0 |
| Regeneration conditions temp 350° F., GHSV 6000 hr$^{-1}$ | | | | | | | |
| Inlet Gas | $H_2$ ppm | % $N_2$ | % $CO_2$ | % $H_2O$ | ppm CO | | | |
| | | 1442 | 76.7 | 13.1 | 10.0 | 721 | | |
| Off Gas | Time, min. | 1 | 2 | 3 | 4 | | | |
| | NOx ppm | | 5.0 | | 1.0 | | | |
| | $SO_2$ ppb | | 39.2 | | 9.9 | | | |

Comments:

This test demonstrated regeneration using hydrogen and carbon monoxide as reactant gases and nitrogen as the carrier gas. The efficiency for NOx destruction was 99.5%.

Example 12

| Absorption temp 350° F.; GHSV 20,000 hr$^{-1}$ | | | | | | | |
|---|---|---|---|---|---|---|---|
| Off Gas | Time, min. | 2 | 6 | 10 | 15 | 20 | 25 | 30 |
| | NOx ppm | 0.4 | 0.65 | 1.15 | 3.05 | 5.2 | 6.95 | 8.6 |
| | SO$_2$ ppb | 0 | 0 | 1.1 | 5.5 | 92.2 | 16.6 | 20.6 |

| Regeneration conditions temp 350° F., GHSV 4,200 hr$^{-1}$ | | | | | | | |
|---|---|---|---|---|---|---|---|
| Inlet concentrations | | H$_2$ ppm | | | ppm CO | | |
| | | 2000 | | | 1000 | | |
| Off Gas | Time, min. | 2 | 4 | 6 | 10 | 16 | 21 |
| | NOx ppm | 15 | 0.3 | 0.23 | 0.15 | 0.12 | 0.11 |
| | CO ppm | 4.2 | 10.8 | 13.5 | 15.1 | 32 | 32 |

Comments:

This test demonstrated regeneration using hydrogen and carbon monoxide as reactant gases and nitrogen as the carrier gas at 350° F. The efficiency for destruction of NOx was 99.8%.

A person of ordinary skill in the art may make changes and modifications to the present process without departing from the spirit and scope of the present invention. It is contemplated that the present invention is encompassed by the claims as presented herein and by all variations thereof coming within the scope of equivalents accorded thereto.

The invention claimed is:

1. A method of regenerating a devitalized absorber having nitrogen oxides absorbed therein or thereon, said method comprising the steps of:

providing a stream of regenerating gas comprising a reducing gas, said reducing gas having an effective amount for removing said nitrogen oxides from said devitalized absorber, and an inert carrier gas; and passing said stream of regenerating gas comprising an inert carrier gas and a component selected from the group consisting of hydrogen, carbon monoxide and mixtures thereof over said devitalized absorber comprising an alumina support with a platinum coating thereon and having nitrogen oxides absorbed therein or thereon for an effective time, at an effective temperature and at an effective space velocity to remove said nitrogen oxides from said devitalized absorber to form a regenerated absorber.

2. The method of claim 1 wherein said temperature is in the range of 250° F. to 750° F.

3. The method of claim 1 wherein said regenerating gas further comprises up to 10% carbon dioxide.

4. The method of claim 1 wherein reducing gas is carbon monoxide.

5. The method of claim 1 wherein said reducing gas is hydrogen.

6. The method of claim 1 wherein said reducing gas is a mixture of carbon monoxide and hydrogen.

7. The method of claim 1 wherein the space velocity is in the range of 10 hr$^{-1}$ to 100,000 hr$^{-1}$.

8. The method of claim 7 wherein the space velocity is in the range of 500 to 16,000 hr$^{-1}$.

9. The method of claim 1 wherein the absorber has a coating of an alkali or alkaline earth carbonate or bicarbonate thereon.

10. The method of claim 9 wherein the alkali or alkaline earth carbonate is a potassium carbonate.

11. The method of claim 1 wherein the absorber may be aqueous or non-aqueous platinum.

12. The method of claim 1 wherein the the inert carrier gas comprises nitrogen, helium, argon or steam.

13. A method of regenerating a devitalized catalyst/absorber and having nitrogen oxides absorbed therein or thereon, comprising the steps of:

providing a stream of inert carrier gas containing an effectuating amount of a reducing agent selected from carbon monoxide, hydrogen gas and mixtures thereof said stream further characterized as containing at least carbon monoxide or carbon dioxide for removing said nitrogen oxides from said catalyst/absorber and restoring a carbonate form for said alkali or alkaline earth;

passing said gaseous stream over said exhausted catalyst/absorber comprising an oxidation catalyst specie selected from platinum, palladium, rhodium, cobalt, nickel, iron, copper, molybdenum or combinations thereof disposed on a high surface area support, said catalytic component being intimately and entirely coated with an absorber material selected from a hydroxide, carbonate, bicarbonate or mixture thereof of an alkali or alkaline earth or mixtures thereof and having nitrogen oxides absorbed therein or thereon for an effective time, at a temperature in the range of 250° to 750° F. and at a GHSV in the range of 10 to 100,000 hr$^{-1}$ to remove said nitrogen oxides from said devitalized catalyst/absorber to form a regenerated catalyst/absorber.

14. The method of claim 13 wherein said inert carrier gas comprises nitrogen, steam or mixtures thereof.

15. The method of claim 14 wherein said inert carrier gas comprises nitrogen and said reducing agent comprises about 500 ppm to 10% carbon monoxide.

16. The method of claim 14 wherein said inert carrier gas comprises steam.

17. The method of claim 14 wherein said inert carrier gas comprises nitrogen and said reducing agent comprises about 500 ppm to 10% hydrogen.

18. The method of claim 14 wherein said alkali or alkaline earth is lithium, sodium, potassium or calcium.

19. The method of claim 18 wherein said alkali or alkaline earth comprises potassium.

20. The method of claim 14 wherein said inert carrier gas comprises steam.

* * * * *